United States Patent [19]

Gillingham et al.

[11] Patent Number: 5,371,764
[45] Date of Patent: Dec. 6, 1994

[54] METHOD AND APPARATUS FOR PROVIDING AN UNINTERRUPTED CLOCK SIGNAL IN A DATA PROCESSING SYSTEM

[75] Inventors: Ronald D. Gillingham; Charles L. Johnson, both of Rochester, Minn.

[73] Assignee: International Business Machines Corporation, Armonk, N.Y.

[21] Appl. No.: 905,054

[22] Filed: Jun. 26, 1992

[51] Int. Cl.$^5$ ............................................. H04L 7/00
[52] U.S. Cl. ................................. 375/106; 375/120; 331/49; 307/23; 307/65; 307/80
[58] Field of Search ................. 375/106, 118, 10, 120; 331/46, 49; 307/23, 64, 65, 80, 269, 219; 328/63, 72, 61; 371/8.1; 364/934.51

[56] References Cited

U.S. PATENT DOCUMENTS

| | | | |
|---|---|---|---|
| 3,289,097 | 11/1966 | Martin | 331/49 |
| 3,329,905 | 7/1967 | Niertit et al. | 331/49 |
| 3,370,251 | 2/1968 | Overstreet, Jr. | 331/55 |
| 3,662,277 | 5/1972 | White | 331/2 |
| 3,769,607 | 10/1973 | Thelen | 331/2 |
| 3,795,872 | 3/1974 | Napolitano et al. | 331/49 |
| 3,956,704 | 5/1976 | Keeney, Jr. et al. | 328/61 |
| 4,019,143 | 4/1977 | Fallon et al. | 375/108 |
| 4,254,492 | 3/1981 | McDermott, III | 368/119 |
| 4,297,649 | 10/1981 | Sbuelz et al. | 331/2 |
| 4,419,629 | 12/1983 | O'Brien | 162/962 |
| 4,583,054 | 4/1986 | Basile | 670/620 |
| 5,122,677 | 6/1992 | Sato | 331/49 |

OTHER PUBLICATIONS

IBM Technical Disclosure Bulletin, vol. 15, No. 10, Mar. 1973, pp. 3221–3222; D. M. Junod: "Synchronized Switching Between Unsynchronized Oscillators".
IBM Technical Disclosure Bulletin, vol. 12, No. 1, Jun. 1969 pp. 147–148; K. A. Duke and H. D. Schnurmann: "Redundancy Technique for Crystal Oscillators".

*Primary Examiner*—Tesfaldet Bocure
*Attorney, Agent, or Firm*—Michael J. Anglin; Duke W. Yee; Andrew J. Dillon

[57] ABSTRACT

A digital computer is provided having a clock generation circuit for generating a clock signal in response to an input signal from a fixed-frequency oscillator, which includes a first fixed-frequency oscillator and a second fixed-frequency oscillator, each providing an output signal. Also included is failure detection circuit for detecting a failure of either of the fixed-frequency oscillators, wherein a failure occurs when the first fixed-frequency oscillator or the second fixed-frequency oscillator ceases generating an output. A circuit synchronizing the output from the oscillators is coupled to both the first fixed-frequency oscillator and to the second fixed-frequency oscillator. This synchronizing circuit modifies the output from the second fixed-frequency oscillator to produce a synchronized output that is substantially synchronous with the output from the first fixed frequency oscillator. A switching circuit is coupled to the failure detection circuit, the output from the first fixed-frequency oscillator and the synchronized output of the second fixed-frequently oscillator. The switching circuit normally couples the output of the first fixed-frequency oscillator as the clock signal and wherein in response to a detection of a failure of the first fixed-frequency oscillator, the synchronized output is provided as the clock signal.

11 Claims, 6 Drawing Sheets

METHOD AND APPARATUS FOR PROVIDING AN UNINTERRUPTED CLOCK SIGNAL IN A DATA PROCESSING SYSTEM

BACKGROUND OF THE INVENTION

1. Technical Field

The present invention relates in general to a method and apparatus for improving reliability in a computer system and in particular, to an improved method and apparatus which allows a computer system to remain in operation when an oscillator providing a signal for generating a system clock signal fails. Still more particularly, the present invention relates to an improved method and apparatus which allows a computer system to continue operating when one oscillator fails by providing a system for switching from one oscillator to a second oscillator without affecting system operation.

2. Description of the Related Art

Generally, computer systems require very precise clock signals derived from fixed frequency oscillators, such as crystal oscillators, to drive synchronous logic gates. These crystal oscillators provide output signals, which are very stable in frequency, that may be utilized by a clock generation circuit to produce a clock signal. Although crystal oscillators are frequency stable, they are generally not very reliable. Often times, a crystal oscillator will fail before failure of the other components utilized to generate the clock signal.

In computer systems which contain only a single crystal oscillator utilized to provide clock operations in a microprocessor, the failure of that oscillator will result in a shut down of the computer system. Such a failure requires servicing of the computer system to replace the crystal oscillator. Until the crystal oscillator is replaced, however, the computer system may be unusable. Additionally, calculations being performed when such a failure occurs may be lost or may contain errors. This situation is unacceptable in many cases where a sudden and unexpected failure of the computer system may result in an inability of the system to complete processing tasks or in a loss of data.

Some systems have been developed which include a primary oscillator and one or more back-up oscillators that are utilized in the event that the primary oscillator fails. These types of systems provide for switching from an oscillator that has failed to one that is functioning in the event of a failure, reducing the amount of time that a computer system is out of operation. In certain systems, the switching from one oscillator to another oscillator occurs automatically. Problems, which involve the prevention of interruptions in a computer system when the primary oscillator fails, still exist in these systems.

Although crystal oscillators may be carefully selected such that all of the oscillators utilized are closely matched in frequency, it is still very difficult to exactly match frequencies in a manner such that the signals provided by two crystal oscillators will not slip or move out of phase relative to each other. As a result, the output signals from the crystal oscillators may be out of phase when a switch occurs between the oscillators, causing the clock signal to become unstable for a short period of time. Switching from one crystal oscillator to another crystal oscillator may interrupt operations or calculations running on the computer system and may cause errors if the input into a clock generation circuit does not remain constant during the switching of the input from one crystal oscillator to a second crystal oscillator.

Therefore it would be desirable to have a method and apparatus to improve the reliability of computer systems by providing a switching system, which allows a computer to remain operating without interrupts or errors when a fixed frequency oscillator fails.

SUMMARY OF THE INVENTION

It is therefore one object of the present invention to provide a method and apparatus for improving reliability in a computer system.

It is another object of the present invention to provide an improved method and apparatus which permits a computer system to remain in operation when an oscillator providing a signal utilized to generate a clock signal fails.

It is yet another object of the present invention to provide an improved method and apparatus which permits a computer system to continue operating when one oscillator fails by switching from one oscillator to another without affecting system operation.

The foregoing objects are achieved as is now described. A digital computer is provided having a clock generation circuit for generating a clock signal in response to an input signal from a fixed-frequency oscillator, which includes a first fixed-frequency oscillator and a second fixed-frequency oscillator. Each fixed-frequency oscillator provides an output signal. Also included is a failure detection circuit for detecting a failure in either of the fixed-frequency oscillators, wherein a failure occurs when either the first fixed-frequency oscillators or the second fixed-frequency oscillator ceases generating an output. A circuit synchronizing the output from the oscillators is coupled to both the first fixed-frequency oscillator and to the second fixed-frequency oscillator. This synchronizing circuit modifies the output from the second fixed-frequency oscillator to produce a synchronized output that is substantially synchronous with the output from the first fixed frequency oscillator. A switching circuit is coupled to the failure detection circuit, the output from the first fixed-frequency oscillator, and the synchronized output of the second fixed-frequently oscillator. The switching circuit normally couples the output of the first fixed-frequency oscillator as the clock signal. In response to a detection of a failure of the first fixed-frequency oscillator, the switching circuit automatically provides the synchronized output of the second fixed-frequency oscillator as the clock signal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
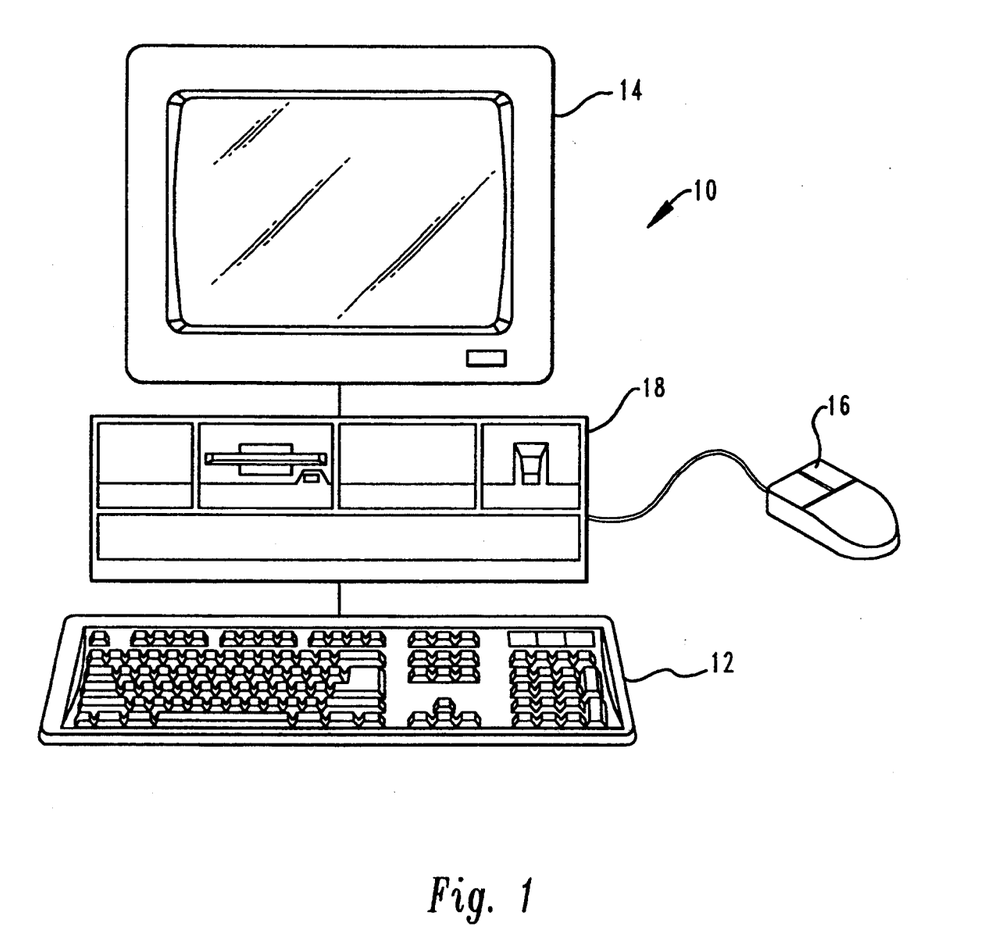
FIG. 1 depicts a pictorial representation of a personal computer in which a preferred embodiment of the present invention may be implemented.

With reference now to the figures and in particular with reference to FIG. 1, there is depicted a pictorial representation of data processing system, personal computer 10, in which a preferred embodiment of the present invention may be implemented. Personal computer 10 preferably includes keyboard 12, video display terminal 14, pointing device 16, and system unit 18.

Figure 2:
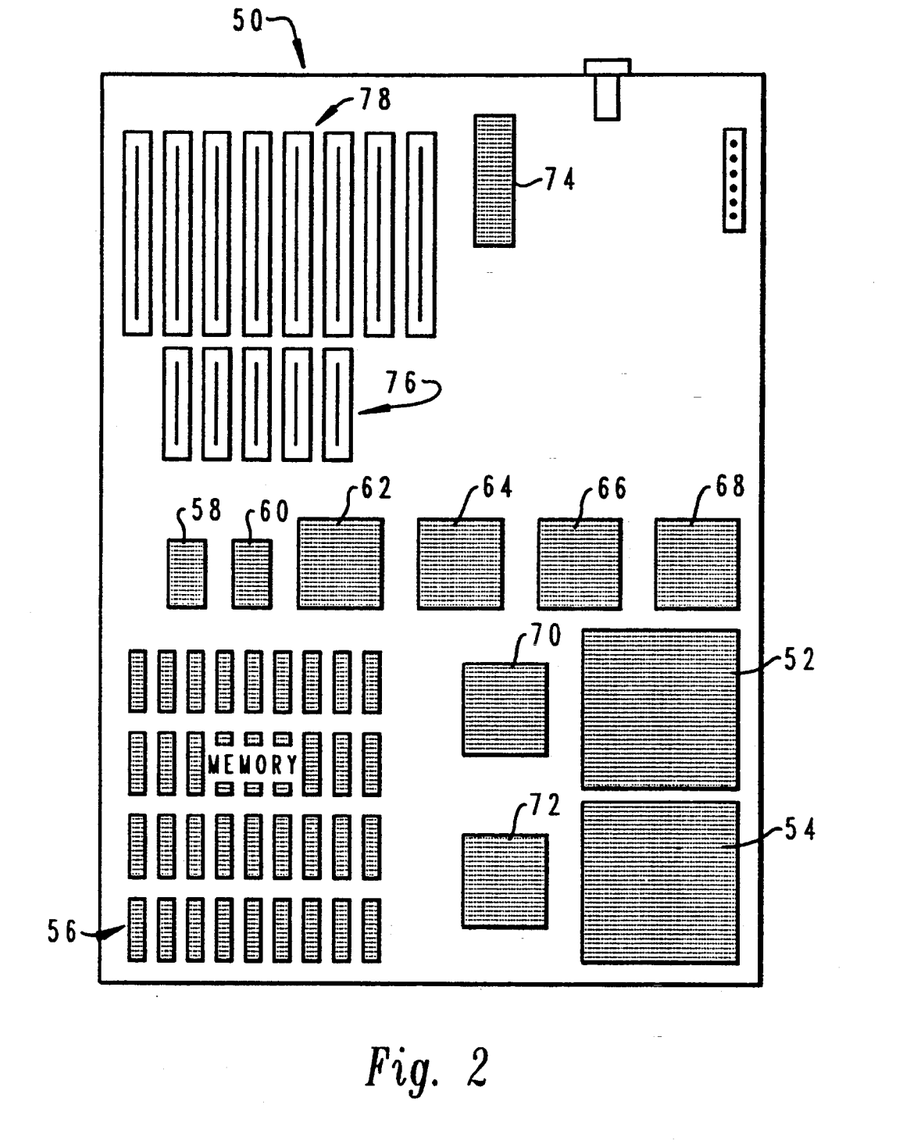
FIG. 2 is a pictorial representation of a circuit board on which a preferred embodiment of the present invention may be implemented.

Referring now to FIG. 2, there is depicted a pictorial representation of a circuit board 50 on which a preferred embodiment of the present invention may be implemented. Circuit board 50 is preferably located in system unit 18 and contains microprocessor 52 and math coprocessor 54. Memory 56 is also located on circuit board 50 along with various other circuits located in chips 58, 60, 62, 64, 66, 68, 70, 72, and 74. Circuit board 50 also typically contains 8 bit expansion slots 76 and 16 bit expansion slots 78. These expansion slots may be utilized to couple various controllers and peripheral devices to personal computer 10. An apparatus constructed in accordance with a preferred embodiment of the present invention may be incorporated into an expansion board for placement into 8 bit expansion slots 76 or into 16 bit expansion slots 78. Alternatively, a preferred embodiment of the present invention may be located directly on circuit board 50. Although the present invention is depicted in a personal computer, it is contemplated that a preferred embodiment of the present invention may be utilized in other types of data processing systems, such as mainframe computers or work stations.

Figure 3:
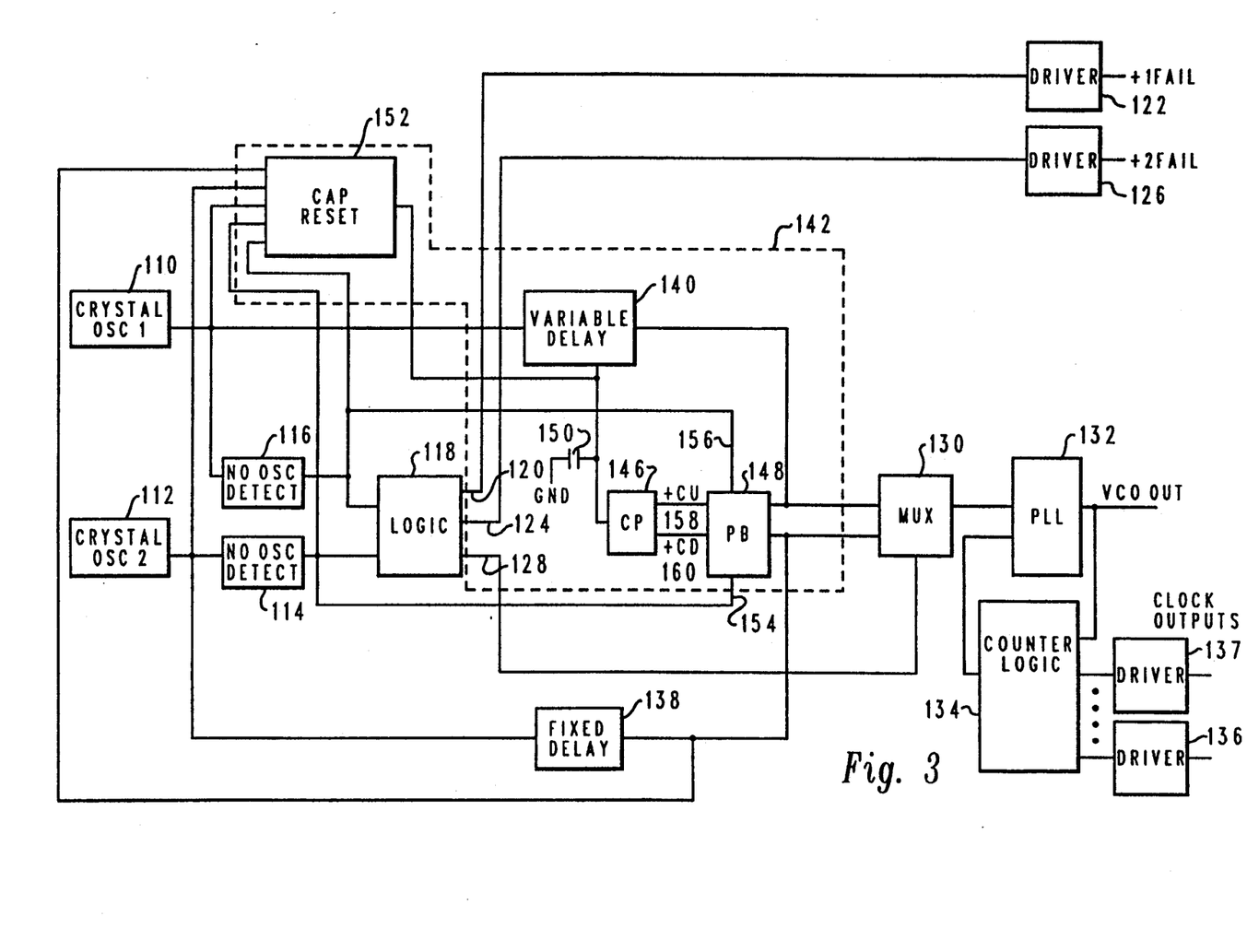
FIG. 3 depicts a schematic diagram of a redundant oscillator circuit in accordance with a preferred embodiment of the present invention.

With reference now to FIG. 3, there is depicted a schematic diagram of a redundant oscillator circuit provided in accordance with a preferred embodiment of the present invention. This redundant oscillator circuit may be implemented on a printed circuit board for use in a data processing system in accordance with a preferred embodiment of the present invention. The redundant oscillator circuit preferably includes two crystal oscillators, OSC 110 and OSC 112. Although the depicted embodiment of the present invention utilizes crystal oscillators, other types of fixed frequency oscillators may be also utilized. In the depicted embodiment, OSC 112 is the primary oscillator that normally provides a signal which may be utilized to generate a clock signal. Although the signal from an oscillator may be utilized directly as a clock signal, normally, the signal from an oscillator, as in the depicted embodiment, is channeled into a clock generation circuit that may be utilized to modify the signal to fit the desired parameters; i.e., a desired frequency. In the depicted embodiment of the present invention, OSC 110 is a secondary or back-up oscillator, which is utilized in the event that OSC 112 should fail.

Although the depicted embodiment illustrates only two oscillators, more than two oscillators may be utilized in accordance with a preferred embodiment of the present invention. For example, three oscillators may be utilized, wherein one oscillator designated as the primary oscillator and the other two oscillators are specified as secondary oscillators. In such a system, if the primary oscillator fails, the circuit may switch to one of the secondary oscillators; if that second oscillator utilized to generate the clock signal also fails, the third oscillator may be utilized to provide the input necessary to maintain a constant clock signal, allowing the computer system to continue functioning. At a later time, the data processing system may be shut down during normal servicing, and the failed oscillators may be replaced at that time.

Still referring for FIG. 3, OSC 112 is coupled to oscillator failure detection circuit 114. Similarly, OSC 110 is coupled to oscillator failure detection circuit 116. These two oscillator failure detection circuits analyze the signals output from the oscillators, and as soon as an oscillator fails, a signal is sent to the respective inputs of logic circuit 118.

In addition to the inputs from oscillator failure detection circuit 114 and oscillator failure detection circuit 116, logic circuit 118 also has three outputs in the preferred embodiment of the present invention. Two outputs are failure indicator outputs which are sent to the computer system indicating that one of the oscillators has failed. Output 120, which is coupled to driver 122, is utilized to indicate that OSC 110 has failed, and output 124, which is coupled to driver 126, is utilized to signal that OSC 112 has failed. Output 128 is coupled to multiplexer 130. The output from each of these drivers may be utilized to indicate that an oscillator has failed.

Additionally, multiplexer 130 has an output coupled to phase-locked loop circuit 132, which produces a square wave as an output which is locked edge to edge with an input from multiplexer 130. Phase-locked loop circuit 132 also has an output coupled to counter logic 134. Furthermore, counter logic circuit 134 has a feedback loop returning to phase-locked loop circuit 132. Counter logic circuit 134 may be utilized to produce a number of clock signals for use in a data processing system. Counter logic circuit 134 also contains two outputs leading to driver 136 and driver 137. The output from these drivers are the clock signals utilized by the data processing system.

Phase-locked loop circuit 132 and counter logic circuit 134 constitute a clock generation circuit that may be utilized to produce a clock signal that is typically four to eight times the frequency of the input signal from a crystal oscillator. Various types of phase-locked loop circuits and counter logic circuits may be utilized to produce a clock signal at a desired frequency in accordance with a preferred embodiment of the present invention. Although the depicted embodiment utilizes phase-locked loop circuit 132 and counter logic circuit 134, those of ordinary skill in the art will realize that other electronic circuits or devices may be employed to construct a clock generation circuit in accordance with a preferred embodiment of the present invention. Alternatively, the output from multiplexer 130 may be directly utilized as the clock signal without any modification.

Furthermore in accordance with a preferred embodiment of the present invention, phase-locked loop circuit 132 acts as a "flywheel" in response to input from an oscillator. Consequently, if the input from a crystal oscillator is terminated, phase-locked loop circuit 132 continues to output a square wave at the frequency desired, but this frequency will slowly drift. Eventually, the frequency will drift far enough that the deviation in frequency of the signal may cause interruption of operations in the computer system.

Referring again to crystal oscillators, OSC 110 and OSC 112, the signal output from OSC 112 is also directed into fixed delay circuit 138 and is then directed as an input into multiplexer 130. The output of OSC 110 is directed through variable delay circuit 140 and into multiplexer 130.

Variable delay circuit 140 is part of a time-delay-loop circuit, delay locked loop circuit 142, which is utilized to synchronize the signal from OSC 110 to the signal from OSC 112 in accordance with a preferred embodiment of the present invention. Delay locked loop circuit 142 also includes charge pump 146, phase detector 148, capacitor 150, and capacitor reset circuit 152. Phase detector circuit 148 includes input 154, which receives a signal from oscillator failure detection circuit 114 and input 156, which receives a signal from oscillator failure detection circuit 116. These signals may be used to degate the phase detector if one of the oscillators fail.

Phase detector circuit 148 may be utilized to determine the phase difference between the output signals from OSC 110 and OSC 112. By comparing the edges of the signals from the crystal oscillators, phase detector circuit 148 then controls the signal from OSC 110 through variable delay circuit 140, keeping the signal from OSC 110 in phase with the signal from OSC 112. If OSC 110 shifts ahead of the signal from OSC 112, phase detector circuit 148 may send a signal through output 158 to charge pump 146 indicating that the variable delay circuit should slow the signal from variable delay circuit 140. In response to this signal, charge pump 146 increases the voltage across capacitor 150, causing the variable delay of variable delay circuit 140 to increase, delaying the signal traveling through variable delay circuit 140. If on the other hand, the signal from OSC 110 is falling behind the signal from OSC 112, phase detector 148 may send a signal through output 160 to charge pump 146 causing the voltage in capacitor 150 to be decreased, causing the delay of variable delay circuit 140 to decrease. This operation keeps the waveform out of the variable delay circuit 140 synchronized with output from fixed delay circuit 138.

After a period of time, the edges of the signal from OSC 110 and OSC 112 may shift 360 degrees or an entire period relative to each other. In the case that the edges of the signals slip an entire period, the edges will line up again, and at that point, the capacitor voltage will likely be ramped to a maximum value. Continual increasing of the capacitor voltage over several periods of slippage is not desirable and may not be possible. As a result, capacitor reset circuit 152 is utilized to reset the capacitor to ground when the edges of the two signals have slipped an entire period in accordance with a preferred embodiment of the present invention.

Referring again to multiplexer 130, delay locked loop circuit 142 is employed to ensure that the output from OSC 110 and the output from OSC 112 are in phase as they enter multiplexer 130. Logic gate 118 sends a signal to multiplexer 130 through output 128 to switch from OSC 112 path to OSC 110 path in the event that OSC 112 fails. Switching occurs without disturbing the clock signal generated by the redundant oscillator circuit in accordance with a preferred embodiment of the present invention. Logic circuit 118 may be implemented in various forms in accordance with a preferred embodiment of the present invention. Table 1 shows a truth table for logic gate 118, as implemented in a preferred embodiment of the present invention:

TABLE 1

| OSC 110 FAIL DETECT | OSC 112 FAIL DETECT | FAIL SIGNAL OSC 110 | FAIL SIGNAL OSC 112 | CNTL TO MUX | RESULT |
|---|---|---|---|---|---|
| 0 | 0 | 0 | 0 | 0 | NO ERROR |
| 0 | 1 | 1 | 0 | 1 | OSC 112 FAILED |
| 1 | 0 | 0 | 1 | 0 | OSC 110 FAILED |
| 1 | 1 | 1 | 1 | 1 | BOTH OSC 110 & OSC 112 FAILED |

This table assumes that the multiplexer "CMUX") selects the fixed delay oscillator path for the control signal ("CNTL") equal to 0 and the variable delay oscillator path for CNTL equal to 1. FAIL SIGNAL OSC 110 and FAIL SIGNAL OSC 112 are the signals sent to the data processing system, indicating that an oscillator has failed.

Figure 4:
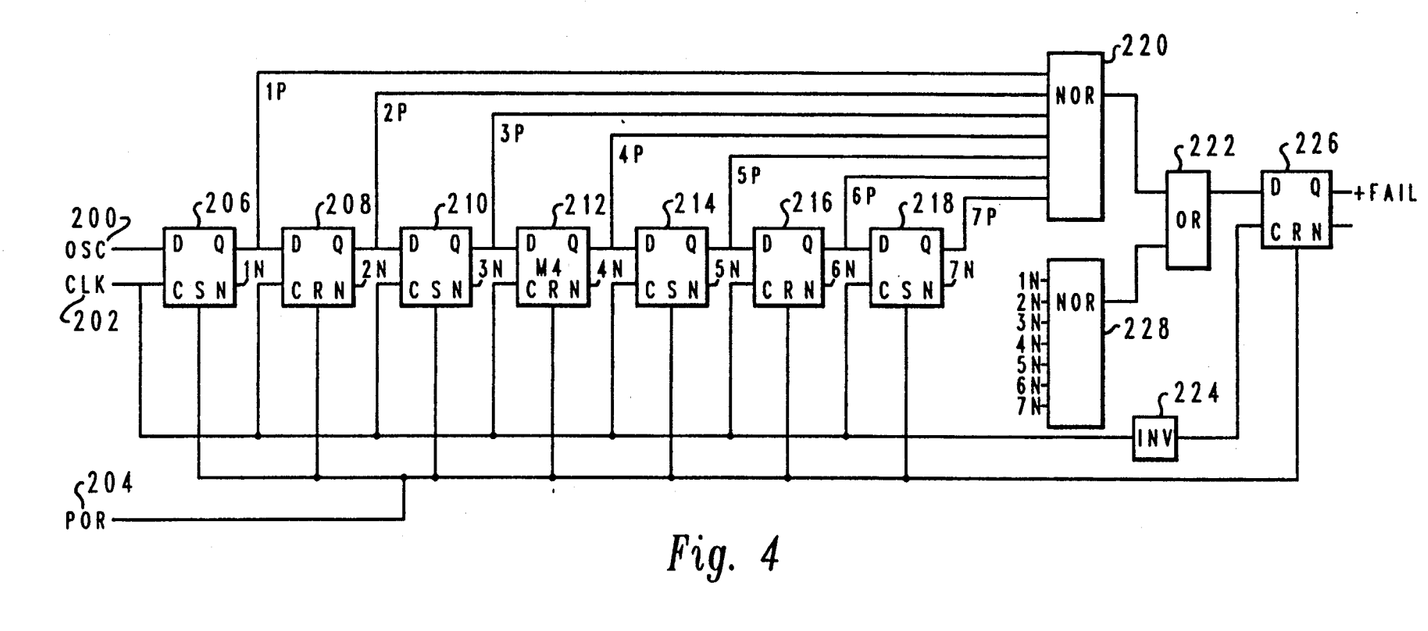
FIG. 4 is a detailed schematic diagram of an oscillator failure detection circuit.

Referring now to FIG. 4, there is depicted a detailed schematic diagram of an oscillator failure detection circuit. Generally, a failure occurs if the crystal oscillator fails to emit an output signal or becomes defective such that a constant high or low signal is emitted. An "output" from a fixed-frequency oscillator is a signal that is usable by the data processing signal as a clock signal or a signal that is usable by a clock generation circuit to produce a clock signal that is usable by the data processing system. In other words, the signal must allow a data processing system to perform operations without error due to a failure of the fixed-frequently oscillator.

Oscillator signal, OSC 200, is sampled by clock signal, CLK 202. An input signal, POR 204, is utilized to reset the logic gates at power up. D flip-flops 206, 208, 210, 212, 214, 216, and 218 form a shift register that shifts the data from OSC 200 by seven pulses. If OSC 200 stays low for seven clock pulses, all of the D flip-flops have a down-level output as illustrated by signals 1P–7P. As a result NOR gate 220 becomes active, activating OR gate 222. On the next negative edge of CLK 202, invertor 224 clocks OR gate 222 output to the fail line through D flip-flop 226, which is used to indicate that the oscillator has failed.

In the event that OSC 200 remains high, all of the D flip-flops' complimentary outputs, 1N–7N, would become high, activating NOR gate 228. As a result, OR gate 222 would be activated and on the next negative edge of CLK 202, invertor 224 would clock the signal from OR gate 222 through D flip-flop 226 to indicate a failure. Although the depicted embodiment illustrates using 7 D flip-flops for sampling over 7 pulses, other numbers of D flip-flops may be utilized and the ratio of the CLK frequency to the OSC frequency may be altered. Additionally, other types of latches and NOR-/OR logic may be utilized in accordance with a preferred embodiment of the present invention. Clock signal, 202, may be the output of phase-locked loop circuit 132, which can have a frequency much higher than that of OSC 110 or OSC 112.

Figure 5:
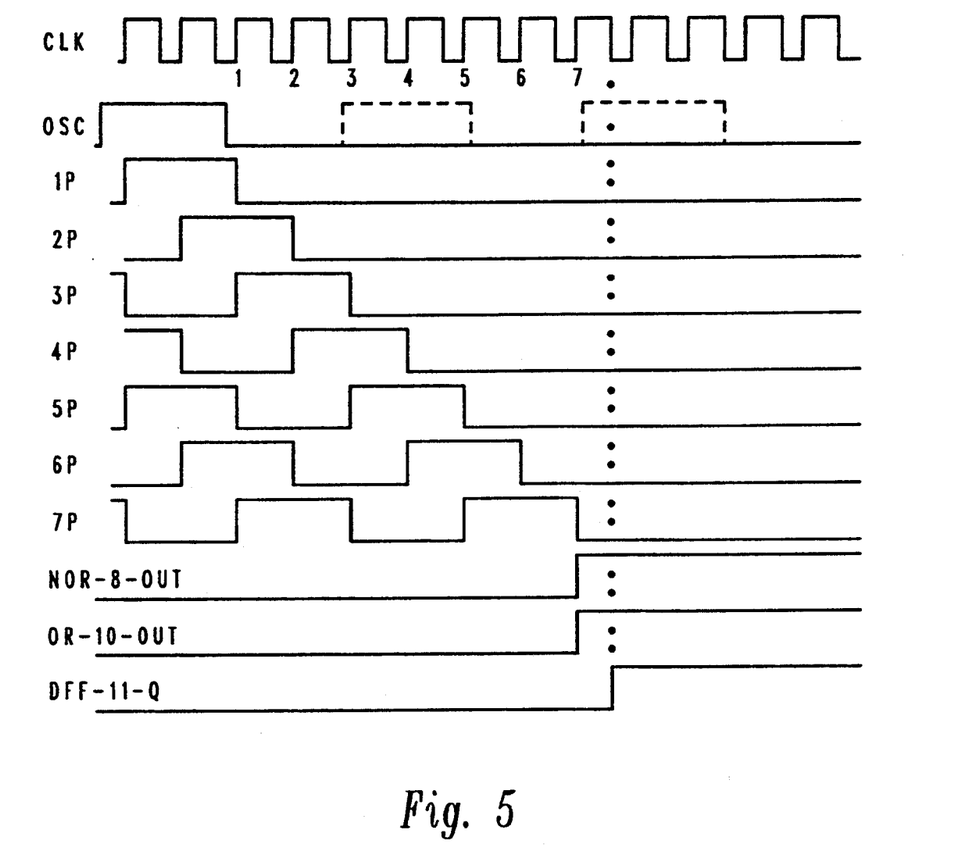
FIG. 5 depicts a graphical representation of wave forms illustrating the output of the oscillator failure detection circuit.

With reference now to FIG. 5, there is depicted a graphical representation of waveforms, illustrating the output from the oscillator failure detection circuit. When the oscillator fails to provide an output signal, an output signal is sent to NOR gate 220 each clock signal through outputs 1p-8p. If the oscillator fails to provide a signal for seven clock pulses, NOR gate 220 becomes active as illustrated by signal NOR-8-OUT, resulting in OR gate 222 also becoming activated as depicted by signal OR-10-OUT. On the next clock pulse, the output from OR gate 222 is clocked out to the fail line by D-flip-flop 228 as illustrated by signal DFF-11-Q.

Figure 6:
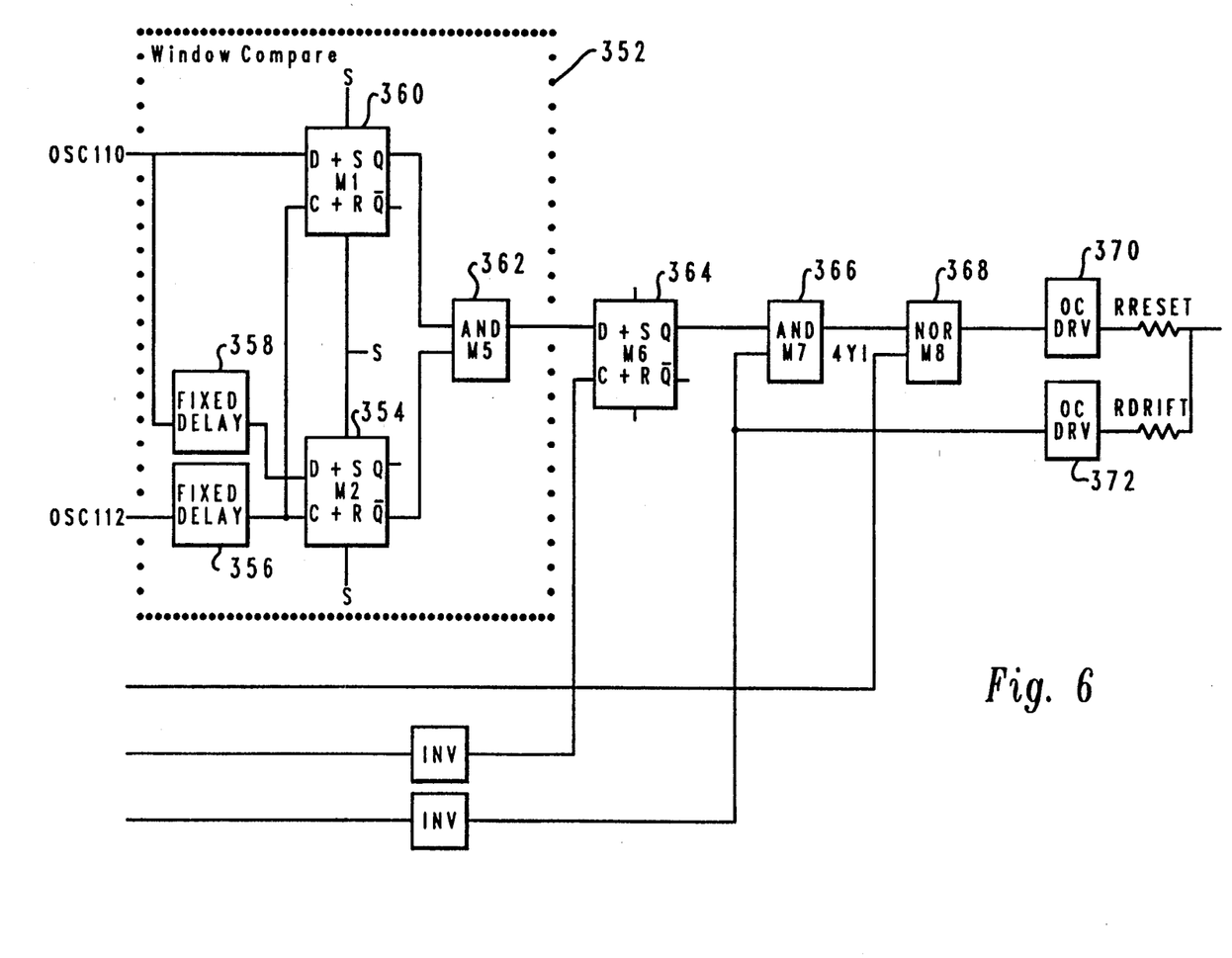
FIG. 6 is a detailed schematic diagram of the capacitor reset circuit.

Referring now to FIG. 6, there is depicted a detailed schematic diagram of the capacitor reset circuit. Capacitor reset circuit 152 includes window comparator circuit 352, which utilizes fixed delay circuits and D flip-flops to determine whether or not the capacitor should be reset. The signal from OSC 112 is compared to a window generated at D flip-flop 354. The signal from OSC 112 is sent through fixed delay circuit 356, which delays the signal by a predetermined amount of time; i.e., 2 nanoseconds. The signal from OSC 110 is sent into fixed delay circuit 358 which delays the signal by twice the delay utilized in fixed delay circuit 356; i.e., 4 nanoseconds. The signals from fixed delay circuit 356 and fixed delay circuit 358 are sent into D flip-flop 354 to form a "window" for comparison against the signal from OSC 112.

The signal from OSC 112 traveling though D flip-flop 360 is compared to the "window" created in D flip-flop 354 at AND gate 362. If the signal from OSC 112 is within the "window", the capacitor is then reset. D flip-flop 364 is utilized to synchronize the resetting of the capacitor. D flip-flop 364 receives a clock input from fixed delay circuit 138. AND gate 366 is utilized to allow the voltage at the capacitor to drift back to a ground state if OSC 112 fails an inverted signal from oscillator failure detection circuit 114 is input into AND gate 366. NOR gate 368 is employed to disable the function of resetting the capacitor in the event that OSC 110 fails. NOR gate 368 receives an input from oscillator failure detection circuit 116. A failure of OSC 110 results in a situation where there is no longer a need to reset the capacitor, since the crystal oscillator no longer emits signal for calibration. The failure of OSC 112 results in the circuit allowing the capacitor to drift.

Open-Collector Driver 370 is coupled to RRESET resistor, which is coupled to capacitor 150. Open-Collector Driver 372 is coupled to RDRIFT resistor, which in turn is coupled to capacitor 150. RRESET resistor causes the capacitor to be reset to ground, while RDRIFT resistor results in the capacitor slowly drifting back to ground.

If either of the crystal oscillators fail, in accordance with a preferred embodiment of the present invention, phase detector circuit 148 is no longer utilized. In such a situation, there is no point in continuing to utilize the delay locked loop circuit. As a result, the capacitor will drift back to ground, and the variable delay is eliminated, causing the clock phase to drift back to some nominal value Although the clock phase may drift, this occurs over several thousand cycles and the amount of drift is very small. Alternatively, the delay locked loop circuit may be continued to be utilized to maintain the delay at a fixed point.

While the invention has been particularly shown and described with reference to a preferred embodiment, it will be understood by those skilled in the art that various changes in form and detail may be made therein without departing from the spirit and scope of the invention.

What is claimed is:

1. A digital computer clock generation circuit for generating a clock signal in response to an input signal from a fixed-frequency oscillator, said digital computer clock generation circuit including a first fixed-frequency oscillator, and a second fixed-frequency oscillator, each fixed-frequency oscillator providing an output, said digital computer clock generation circuit comprising:

failure detection means for detecting a failure of either said first-fixed-frequency oscillator or said second fixed-frequency oscillator, wherein a failure occurs when either said first fixed-frequency oscillator or said second fixed-frequency oscillator ceases generating an output;

synchronizing means, coupled to said first fixed-frequency oscillator and to said second fixed-frequency oscillator, for modifying said output from said second fixed-frequency oscillator to produce a synchronized output that is substantially synchronous with said output from said first fixed-frequency oscillator, wherein said synchronizing means includes time-shifting means for time-shifting said output from said second fixed-frequency oscillator, wherein said output from said second fixed-frequency oscillator becomes substantially synchronous with said output from said first fixed-frequency oscillator, and wherein said time-shifting means includes a time-delay-loop circuit; and switching means coupled to said failure detection means, wherein said switching means receives an output from said first fixed-frequency oscillator and said synchronized output and normally provides said output from said first fixed-frequency oscillator as said clock signal, wherein in response to a detection of a failure of said first fixed-frequency oscillator, said synchronized output is provided as said clock signal, and wherein said switching means includes means for providing said synchronized output as said clock signal such that a disturbance in said clock signal is absent.

2. The digital computer clock generation circuit of claim 1, wherein said switching means is a multiplexer, having a first input for receiving said output from said first fixed-frequency oscillator, a second input for receiving said synchronized output, a control input coupled to said means for detecting a failure, and an output for transmitting a clock signal from a selected input.

3. The digital computer clock generation circuit of claim 2 further comprising:

a phase-locked loop circuit coupled to said switching means, said phase-locked loop circuit receiving said clock signal from said switching means and producing a modified clock signal at a predetermined frequency, wherein a failure of both said first fixed-frequency oscillator and said second fixed-frequency oscillator results in a clock signal at a frequency less than said predetermined frequency; and a counter logic circuit coupled to said phase-locked loop circuit, said counter logic circuit producing a plurality of modified clock signals in response to receiving said modified clock signal from said phase-locked loop circuit.

4. The digital computer clock generation circuit of claim 3, wherein said first fixed-frequency oscillator and said second fixed-frequency oscillator are crystal oscillators.

5. The digital computer clock generation circuit of claim 4, wherein said predetermined frequency is greater than 100 megahertz.

6. The digital clock generation circuit of claim 1, wherein said time-delay-loop circuit is a delay locked loop circuit.

7. A circuit for switching from a primary fixed-frequency oscillator to a secondary fixed-frequency oscillator while maintaining a clock signal at a predetermined frequency, each fixed-frequency oscillator providing a clock signal as an output, said circuit comprising:

failure detecting means for detecting a failure of either said primary fixed-frequency oscillator or said second fixed-frequency oscillator;

synchronizing means, coupled to said primary fixed-frequency oscillator and to said secondary fixed-frequency oscillator, for modifying said output from said secondary fixed-frequency oscillator to produce a synchronized output that is substantially synchronous with said output from said primary fixed-frequency oscillator, wherein said synchronizing means includes time-shifting means for time-shifting said output from said secondary fixed-frequency oscillator, wherein said output from said secondary fixed-frequency oscillator becomes substantially synchronous with said output from said primary fixed-frequency oscillator, and wherein said time-shifting means includes a time-delay-loop circuit; and switching means coupled to said means for detecting a failure, wherein said switching means receives said output from said primary fixed-frequency oscillator and said synchronized output and normally provides said output from said primary fixed-frequency oscillator as said clock signal and wherein in response to a detection of a failure of said primary fixed-frequency oscillator, said synchronized output is provided as said clock signal.

8. The circuit of claim 7, wherein said switching means is a multiplexer having a first input for receiving said output from said primary fixed-frequency oscillator, a second input for receiving said synchronized output, a control input coupled to said means for detecting a failure, and an output for transmitting a clock signal from a selected input.

9. The circuit of claim 8 further comprising:

a phase-locked loop circuit coupled to said switching means, said phase-locked loop circuit receiving said clock signal from said switching means and producing a modified clock signal at a predetermined frequency; and a counter logic circuit coupled to said phase-locked loop circuit, said counter logic circuit producing a plurality of modified clock signals in response to receiving said modified clock signal from said phase-locked loop circuit.

10. The circuit of claim 9, wherein said first fixed-frequency oscillator and said second fixed-frequency oscillator are crystal oscillators.

11. The circuit of claim 9, wherein said time-delay-loop circuit is a delay locked loop circuit.

* * * * *